Aug. 25, 1925.  1,550,965
G. J. KALBERER
ROD FEEDING CHUCK FOR AUTOMATIC SCREW MACHINES
Filed Oct. 20, 1923
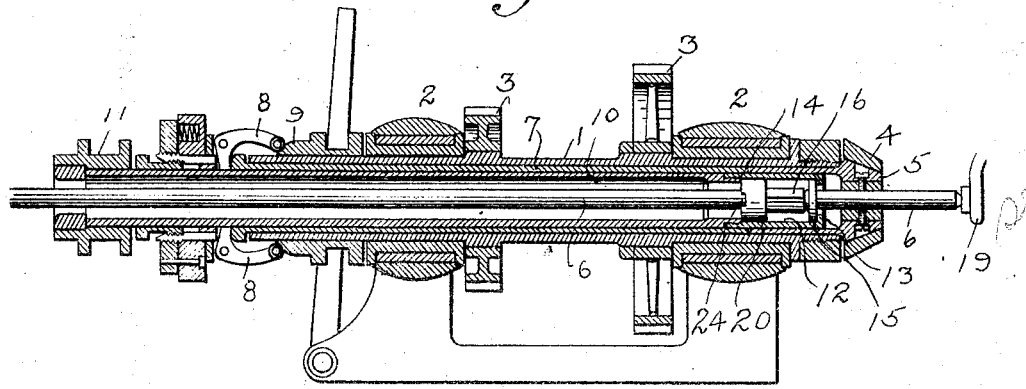
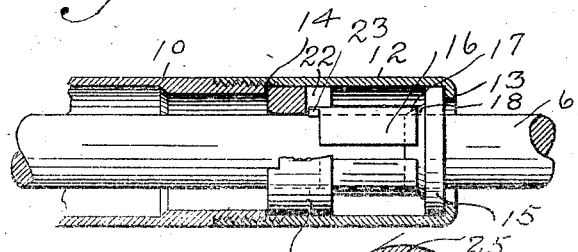
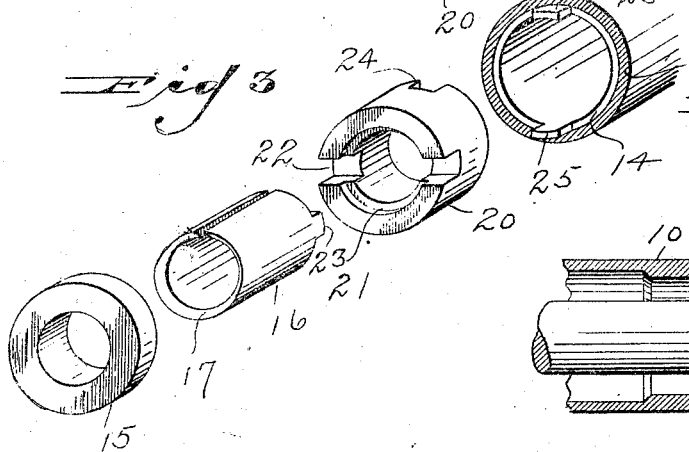
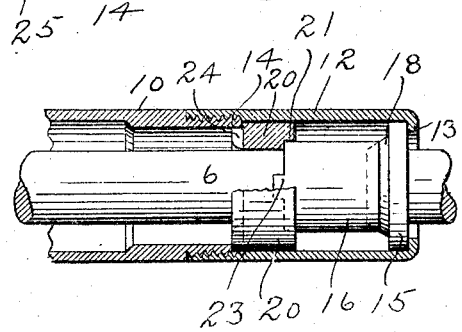
Inventor
George J. Kalberer
By F. L. Walker
Attorney Patented Aug. 25, 1925.

1,550,965

UNITED STATES PATENT OFFICE.

GEORGE JOHN KALBERER, OF HAMILTON, OHIO.

ROD-FEEDING CHUCK FOR AUTOMATIC SCREW MACHINES.

Application filed October 20, 1923. Serial No. 669,715.

*To all whom it may concern:*

Be it known that I, GEORGE J. KALBERER, a citizen of the United States, residing at Hamilton, in the county of Butler and State of Ohio, have invented certain new and useful Improvements in Rod-Feeding Chucks for Automatic Screw Machines, of which the following is a specification.

My invention relates to automatic screw machines and more particularly to the stock feeding means by which the stock is intermittently advanced for successive machining operations.

As ordinarily constructed there is provided within the feed spindle of the usual type of automatic screw machine a reciprocatory feed tube carrying at its forward end a spring chuck or feed shell which consists of a tubular nozzle longitudinally slotted to form a series of spring fingers which frictionally engage the stock rod extending through the feed tube and spindle. While such automatic screw machines are adapted to work upon stock of different diameters it is necessary to substitute a different feed tube or frictional chuck for each size of stock. These feed tubes or frictional chucks are rather expensive to manufacture and are moreover subject to excessive wear and undue slippage.

The present invention contemplates the employment of a single feed shell for all sizes of stock within the capacity of the machine and the employment within such feed shell of interchangeable stock clutching means which is not only simple in construction but may be very cheaply and inexpensively manufactured preferably upon the screw machine itself, and which will afford increased grasping power upon the stock to minimize slippage and by providing an extended uniform bearing surface the wear upon such stock engaging means is minimized. In a simple form this stock feeding means consists of a split spring sleeve having a tendency to contract tightly upon the rod of stock in association with two abutment collars which surround the stock rod at opposite ends of the gripping sleeve and to gage limiting stops within the feed shell to transmit the movement of the feed shell in either direction to such rod gripping sleeve. The gripping sleeve is beveled at one end, and the corresponding collar is provided with a beveled face having wedging engagement within the beveled end of the sleeve upon retraction of the feed tube, to expand the tube and relieve its gripping tension upon the stock. The opposite end of the sleeve has interlocking engagement with the second collar which is in turn interlocked with the feed tube to prevent relative rotation of the chuck or gripping sleeve and the feed tube. It is this feature of interlocking the gripping sleeve and feed tube against relative rotation which distinguishes the present application from my co-pending application Serial No. 656,357, filed August 8, 1923 of which the present application is a continuation in part.

The object of the invention is to simplify the structure as well as the means and mode of operation of rod feeding mechanism for intermittently advancing a rod through step by step movement which will not only be cheapened in construction, but will be more efficient in use, positive in operation, uniform in action, easily controlled and unlikely to get out of repair.

A further object of the invention is to provide a rod feeding device which will be subject to minimum slippage and also to minimum wear.

A further object of the invention is to provide rod engaging means which may be economically manufactured for interchangeable use within a standard feed shell, to accommodate rod stock of different diameters.

With the above primary and other incidental objects in view as will more fully appear in the specification, the invention consists of the features of construction, the parts and combinations thereof, and the mode of operation, or their equivalents as hereinafter described and set forth in the claims.

In the accompanying drawings wherein is shown the preferred, but obviously not necessarily the only form of embodiment of the invention, Fig. 1 is a longitudinal sectional view through the feeding spindle of an automatic screw machine illustrating the relation of the stock engaging means forming the subject matter hereof, with the operative parts of the machine. Fig. 2 is a longitudinal sectional view of the feeding shell and work engaging parts therein. Fig. 3 is a detail perspective view of the interchangeable stock engaging parts removed from the feeding shell. Fig. 4 is a longitudinal sectional view similar to Fig. 2, taken on a plane perpendicular to that of Fig. 2.

Like parts are indicated by similar characters of reference throughout the several views.

While the present invention is equally applicable to any of the various screw machines made by different manufacturers at the present time, for convenience of illustration it has been shown embodied in the feeding spindle of a Cleveland screw machine. In Fig. 1 of the drawing, 1 is a hollow or tubular spindle mounted for rotation in bearings 2—2 and rotated by the driving gears 3, which intermesh with corresponding gears upon a countershaft. At its forward end the spindle 1 is provided with a chuck comprising an internally tapered nose piece 4 within which engages the spring collet 5 which grips and holds the rod stock 6 during the machining operation. The collet 5 is longitudinally slotted to afford a contractible series of segments which is contracted into engagement with the rod 6 by forward pressure within the tapered collet 4. The collet 5 is pressed forward to effect its contraction upon the stock rod 6 by the reciprocation of the chuck sleeve 7 mounted concentrically within the hollow spindle 1 and actuated forwardly by the pressure dogs 8. These pressure dogs are actuated by the sliding cone 9 controlled by a suitable cam upon the machine.

Located within the chuck sleeve 7 and concentric therewith is the reciprocatory feeding tube 10 carrying at its rear end the grooved collar 11 engaged by a cam controlled yoke by which the feed tube is reciprocated. The feed tube 10 is provided at its forward end with a stock engaging means which grasps the stock rod 6 and upon the forward movement of the feed tube during the period of relaxation or disengagement of the chuck 5, carries the stock rod 6 forward in unison with the feed tube to present the end of the rod beyond the chuck jaws 5 preparatory to the next machining operation. Such is the usual and customary operation of automatic screw machine feeding mechanism which per se forms no part of the present invention.

In lieu of the spring gripper fingers ordinarily provided at the forward end of the feed tube 10 there is provided in the present instance a tubular shell or nozzle 12 having at its extremity an inturned flange forming an internal shoulder 13. This shell 12 is not slotted as is usual but is continuous throughout its periphery. The shell 12 is screw threaded into the end of the feed tube 10 which projects within the shell 12 with the end of the feed tube forming a second internal shoulder 14 in spaced relation with the terminal shoulder 13.

Located within the shell 12 in proximate relation with the shoulders 13 and 14 are two abutment collars 15 and 20 which surround the stock rod 6. Also surrounding the rod 6 intermediate the abutment collars 15 and 20 is a split sleeve 16 of spring steel, which tends to tightly contract upon and grip the rod 6. The sleeve 16 is interiorly beveled at its forward end as shown at 17, for engagement with a corresponding conical face 18 upon the forward collar 15. The inherent tendency of the sleeve 16 is to tightly grip the rod or stock 6. Upon the rearward movement of the feed tube at which time the rod 6 is held against retractive movement by the chuck jaws, the conical face 18 exerts a wedging action within the interiorly beveled end 17, tending to expand the sleeve 16 and relax its gripping tension upon the rod, during the retractive movement of the tube, preparatory to the next feeding operation.

The collar 20 at the rear end of the sleeve 16 is preferably though not necessarily, counter-bored, as at 21 to receive the end of the sleeve. The face of the collar 20 is provided with notches or recesses 22, which receive lugs or tongues 23, upon the rear end of the sleeve 16, thereby interlocking the sleeve 16 and collar 20 against relative rotation. The rear face of the collar 20 is also formed with diametrically opposite notches or recesses 24, which to prevent undue weakening of the collar are preferably though not necessarily located upon a diameter perpendicular to that on which the notches 22 are placed. The internal shoulder 14 formed by the end of the feed tube is provided with forwardly projecting lugs or tongues 25, which have a clutching or interlocking engagement with the notches or recesses 24 in the rearward face of the collar 20 to prevent relative rotation of the collar and feed tube. The clutch sleeve 16 being engaged with the collar 20 and the collar 20 in turn engaged with the feed tube, the clutch sleeve is thus interlocked with the feed tube against relative rotation. The feed tube and clutch sleeve 16 therefore, rotate in unison with each other and the bearing faces of the clutch sleeve 16 upon the collar 15 is not subjected to undue wear, nor friction.

While the split sleeve 16 firmly grasps the rod 6 upon which it contracts by its inherent elasticity with sufficient tension to carry the rod with the feed tube so long as the rod is free to move axially, the sleeve 16 will nevertheless, slide or slip upon the rod when the rod is otherwise held against movement by the chuck jaws 5 or by the limiting stop 19 by which the protruding end of the stock necessary for each successive machine operation is measured and the advance of the stock rod arrested. It will be understood that the stock rod 6, the feed tube 10, the chuck 5, and chuck sleeve 7 all rotate in unison with each other and with the spindle 1, In Fig. 1, the stock rod 6 is shown at the limit of its forward or feeding movement and in engagement with the stop 19. The stop arm 19 is then withdrawn and the protruding portion of the rod is operated upon by the various tools to form it to the desired shape and the formed portion is finally severed. The chuck jaws 5, however, continue to hold the rod tightly within their grasp. During the machining operation the feed tube 10 is retracted. Since the rod 6 is tightly held by the chuck jaws it cannot move rearward with the feed tube, consequently the feed tube and gripping sleeve 16 move relative to the rod 6. During this rearward movement the internal shoulder 13 bearing upon the forward collar 15 draws such collar forcibly against the forward end of the gripping sleeve 16, overcoming its frictional engagement with the rod and sliding the sleeve rearwardly thereon. During such differential movement of the gripping sleeve 16 and the stock rod 6, the sleeve is slightly relaxed by the wedging effect of the conical face 18 of the forward collar 15 within the beveled extremity 17 of the sleeve. During such retrograde movement of the parts, the rearward collar 15 moves idly with the feed tube and sleeve. As the parts reach the rearward limit of their range of movement the chuck jaws 5 release the rod 6. There being no resistance to the advance of the rod, the latter is carried forward with the feed tube under the pushing influence of the rearward collar 20, upon which the gripping sleeve abuts and which in turn is engaged and urged forward by the internal shoulder 14. So long as the resistance to the forward movement of the stock rod 6 is insufficient to overcome the gripping tension of the sleeve 16, the rod will continue to advance in unison with the feed tube. However, when the end of the rod 6 engages the stop arm 19 and is arrested thereby, the resistance offered by the stop arm being greater than the gripping tension of the split sleeve 16, the latter will be pushed forward upon the rod 6, to accommodate any further movement of the feed tube if such occurs. However, ordinarily the regulating cam will be adjusted to arrest the feed tube in proper time with the arrest of the rod by the stop 19.

While the invention has been shown and described as applied to round stock it is to be understood that it is to be equally applicable to polygonal rods or bars in which case the split sleeve 16 will likewise be of polygonal form to agree with the contour of the rod.

The gripper sleeves 16 may be made of any suitable length according to conditions of use, the size and weight of the stock operated upon, and other governing factors. Such form of stock gripping device affords a frictional engagement of much greater extent than the usual spring fingers. The gripping effect is thus materially increased and at the same time by the extended uniform bearing the wear upon the feeding parts is materially reduced.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is, therefore, claimed in any of its forms or modifications within the legitimate and valid scope of the appended claims.

Having thus described my invention, I claim:

1. In a construction of the character described, a reciprocatory feed tube through which a rod of stock to be intermittently advanced extends, a split sleeve surrounding the rod and grasping it by its inherent tension, a wedge member pressed into engagement with the sleeve by the movement of the sleeve in one direction, to expand the sleeve and relieve its tensioned grip upon the rod, and means for interlocking the tube and sleeve against relative rotation.

2. In a construction of the character described, a reciprocatory feed tube through which a rod of stock to be intermittently advanced extends, a split sleeve surrounding the rod and grasping it by its inherent tension, means for relieving the tension of the sleeve upon the rod during the retrograde movement of the tube, and means for interconnecting the sleeve and tube for unison rotation.

3. In a construction of the character described, a reciprocatory feed tube, through which a rod of stock to be intermittently advanced extends, a split sleeve surrounding the rod and grasping it by its inherent tension, said sleeve being of less diameter than the tube, and an intermediate coupling member interlocking the tube and sleeve against relative rotation.

4. In a construction of the character described, a reciprocatory feed tube through which a rod of stock to be intermittently advanced extends, a split sleeve surrounding the rod and grasping it by its inherent tension, a collar surrounding the rod of stock within the tube and forming an abutment for said sleeve, co-operating clutch means between the collar and sleeve and also between the collar and tube to resist relative rotation of the sleeve and tube.

5. In a construction of the character described, a reciprocatory feed tube through which a rod of stock to be intermittently advanced extends, a split sleeve surrounding the rod and grasping it by its inherent tension, terminal tongues formed upon the sleeve, an abutment collar for said sleeve surrounding the rod of stock and having in the face thereof notches in which the terminal tongues engage, said collar having splined engagement with the tube whereby the sleeve and tube are held against relative rotation.

6. In a construction of the character described, a reciprocatory feed tube through which a rod of stock to be intermittently advanced extends, a split sleeve surrounding the rod and grasping it by its inherent tension, an abutment collar for said sleeve, one of said members being notched and a projection provided on the other member engageable within the notch to prevent relative rotation of the sleeve and collar.

7. In a construction of the character described, a reciprocatory feed tube through which a rod of stock to be intermittently advanced extends, a split sleeve surrounding the rod and grasping it by its inherent tension, an abutment collar within said tube, one of said members being notched and a projection on the other member engageable in the notch to prevent relative rotation of the collar and tube, said collar affording an abutment for the sleeve.

8. In a construction of the character described, a reciprocatory feed tube through which a rod of stock to be intermittently advanced extends, a split sleeve surrounding the rod and grasping it by its inherent tension, means interconnecting the sleeve and tube to prevent relative rotation, and means for intermittently expanding the sleeve, to relax its engagement upon the stock.

9. In a construction of the character described, a reciprocatory feed tube through which a rod of stock to be intermittently advanced extends, a split sleeve surrounding the rod and grasping it by its inherent tension, an abutment collar at one end of the sleeve interlocking the sleeve with the tube against relative rotation and an abutment collar at the opposite end having a tapered face adapted to expand the sleeve by its thrust engagement therewith to relax the tension of the sleeve upon the rod of stock during the movement of the tube in one direction.

In testimony whereof, I have hereunto set my hand this 9th day of September A. D. 1923.

GEORGE JOHN KALBERER.